US006189682B1

(12) United States Patent
Hill

(10) Patent No.: US 6,189,682 B1
(45) Date of Patent: Feb. 20, 2001

(54) POSITION CONTROL APPARATUS AND METHOD FOR CONTROLLING THE MOVEMENT OF A BLOCK IN A WOODWORKING MACHINE

(75) Inventor: David A. Hill, 2613 NW. Robert Way, Bend, OR (US) 97701

(73) Assignee: David A. Hill, Bend, OR (US)

( * ) Notice: Under 35 U.S.C. 154(b), the term of this patent shall be extended for 0 days.

(21) Appl. No.: 09/088,174

(22) Filed: Jun. 1, 1998

Related U.S. Application Data

(63) Continuation-in-part of application No. 08/838,430, filed on Apr. 7, 1997, which is a continuation of application No. 08/455,020, filed on May 31, 1995, now Pat. No. 5,617,910.

(51) Int. Cl.[7] .............................. B27B 1/00; B27F 1/00; B65G 19/00

(52) U.S. Cl. .......................... 198/718; 198/721; 198/725; 144/2.1; 144/91; 144/248.4; 144/250.14; 144/250.15

(58) Field of Search ............................ 198/626.5, 626.7, 198/718, 721, 725; 144/2.1, 91, 248.4, 250.14, 250.15

(56) References Cited

U.S. PATENT DOCUMENTS

| | | | | |
|---|---|---|---|---|
| 2,858,931 | * | 11/1958 | Winkel | 198/725 |
| 2,868,249 | | 1/1959 | Taylor et al. | 144/91 |
| 3,527,274 | | 9/1970 | Kramer et al. | 144/91 |
| 3,927,705 | | 12/1975 | Cromeens et al. | 144/347 |
| 4,128,119 | | 12/1978 | Maier | 144/347 |
| 4,196,760 | | 4/1980 | McDaniel et al. | 144/4.2 |
| 4,246,943 | | 1/1981 | Cromeens | 144/245.6 |
| 4,429,784 | | 2/1984 | Cromeens | 198/744 |
| 4,941,521 | | 7/1990 | Redekop et al. | 144/374 |
| 5,431,272 | * | 7/1995 | Lindstrom | 198/725 |
| 5,617,910 | * | 4/1997 | Hill | 144/356 |
| 5,636,968 | * | 6/1997 | Soloman | 198/725 |

* cited by examiner

*Primary Examiner*—Christopher P. Ellis
*Assistant Examiner*—Mark A. Deuble
(74) *Attorney, Agent, or Firm*—Kolisch, Hartwell, Dickinson, McCormack & Heuser

(57) ABSTRACT

The present invention provides an automatic lug loader to place blocks on each lug on a lug conveyor in a finger jointing machine. The lug loader includes a support structure with a control station and a feed table. A powered loading conveyor overlies the support structure with an infeed end disposed over the control station. The loading conveyor extends downstream to an outfeed end which is disposed over the upstream end of the lug conveyor. A powered adjuster is connected to the loading conveyor and shifts the loading conveyor toward and away from the control station to selectively grip a block.

7 Claims, 12 Drawing Sheets

100
120
490

355
105
380
390
350
385
265
240
280
235
245
125
395
130
295
305
300
285
290
375
255
135
310
225
320
370
325
250
315
365
230
330
220
322
324
270
275
110
115

POSITION CONTROL APPARATUS AND METHOD FOR CONTROLLING THE MOVEMENT OF A BLOCK IN A WOODWORKING MACHINE

CROSS REFERENCE TO RELATED APPLICATIONS

This application is a continuation-in-part of U.S. patent application Ser. No. 08/838,430, filed Apr. 7, 1997, which is a continuation of U.S. patent application Ser. No. 08/455,020, filed May 31, 1995, now issued as U.S. Pat. No. 5,617,910 on Apr. 8, 1997.

FIELD OF THE INVENTION

This invention relates generally to devices to control the position and movement of boards in woodworking machines. More particularly, the invention is adapted to an apparatus to automatically feed boards to a woodworking machine at controlled intervals and to transfer boards from a side-by-side relationship on one conveyor to an end-to-end relationship on another conveyor.

BACKGROUND OF THE INVENTION

Due to the increasing environmental restrictions on logging and diminishing supplies of high quality old growth timber, the cost of lumber has risen dramatically. In particular, clear lumber, lumber that is free of knots or other defects, has become especially valuable. Because of the increasing cost of natural clear lumber, it is desirable to provide a substitute product formed from lower cost raw material such as low grade lumber, i.e. lumber with knots, cracks, or other defects.

One way to create a long piece of clear lumber is to join small clear pieces together, usually with a joint called a finger joint. This is accomplished by cutting the short clear blocks from longer pieces of low grade lumber and joining those blocks together. The use of finger joints in the assembly of the composite board results in a product that has nearly the same strength as a naturally occurring clear board. This allows lumber that is otherwise only suitable for low value uses to be converted to high value clear lumber.

Small pieces or blocks are normally joined together with the aid of a finger jointing machine. The finger jointing machine mills or cuts fingers into each end of the blocks, applies glue to one or both ends and presses the blocks together so that the fingers on each block interlock, thus forming the final product. Most typically, the blocks are carried through the finger jointing machine on a conveyor that has a number of spaced apart lugs. The boards are placed in a spaced apart side-by-side arrangement, one in front of each lug, and the lugs carry or push the boards through the machine. For maximum efficiency it is important that each lug carry a block through the machine. Any missed lugs result in a reduced output level.

In order to have the highest recovery of clear product from low grade source lumber, it is important that the finger jointing machine be capable of working with blocks of varying length. Currently, finger jointing machines can mill and press together blocks as small as 4" in length. The same machines must also accommodate blocks 36" or longer. In order to avoid the additional step of sorting the short clear blocks into groups of uniform length, the machines are designed to accommodate blocks of assorted lengths in random order, within the above range. Thus a 4" block may directly follow a 30" block, which may in turn be followed by a 16" block. Generally a single sequence of blocks will have the same thickness and width, but a finger jointing machine can usually be set to accept various thicknesses or widths of blocks by some adjustment or modification.

In the past, partially because of the need to accommodate blocks of varying length, a human operator has been required to place each block in front of a lug, attempting to utilize every lug. In addition to being labor intensive and monotonous for the operator, this procedure is far from foolproof and many lugs go unused, thereby reducing efficiency.

After the finger joints are milled in the ends of the blocks, the blocks are placed in an end-to-end relationship on a press conveyor that carries the blocks into a pressing stage. The transfer operation from the lug conveyor to the press conveyor is known as a corner operation since the conveyors typically are oriented transversely to one another. In the past, the corner operation, like the feed operation, required a human operator to pick up each block off the lug conveyor and place it on the transverse conveyor. Thus, transferring the blocks from the lug conveyor to the transverse conveyor has been one of the more labor intensive parts of the process of creating finger jointed boards.

This invention addresses these problems by automating both the loading of the blocks in front of the lugs and the corner operation.

SUMMARY OF THE INVENTION

In order to overcome the need for human operators and increase the efficiency of the finger jointing process by eliminating missed lugs, the present invention provides an automatic lug loader to place blocks on each lug on a lug conveyor in a finger jointing machine. The lug loader includes a support structure with a control station and a feed table. A powered loading conveyor overlies the support structure with an infeed end disposed over the control station. The loading conveyor extends downstream to an outfeed end which is disposed over the upstream end of the lug conveyor. A powered adjuster is connected to the loading conveyor and shifts the loading conveyor toward and away from the control station to selectively grip a block.

The invention also encompasses an automatic cornering apparatus to transfer blocks from a side-to-side relationship on the lug conveyor to an end-to-end arrangement on the transverse conveyor. The cornering apparatus includes a first conveyor with an upstream end and a downstream end. An elongate support structure extends between the downstream end of the first conveyor and an upstream end of a second conveyor, which extends transversely to the support structure. A third overlying conveyor, having a lower gripping surface, extends between the downstream end of the first conveyor and the upstream end of the second conveyor. A powered adjuster is connected to the third conveyor to move the third conveyor toward and away from the second conveyor to selectively grip or release a block.

Both the loader and the comer apparatus of the present invention can accommodate varying length blocks in random order. They also can be set to function with boards of varying width and thickness with minimal readjustment.

DETAILED DESCRIPTION AND BEST MODE OF CARRYING OUT THE INVENTION

Figure 1:
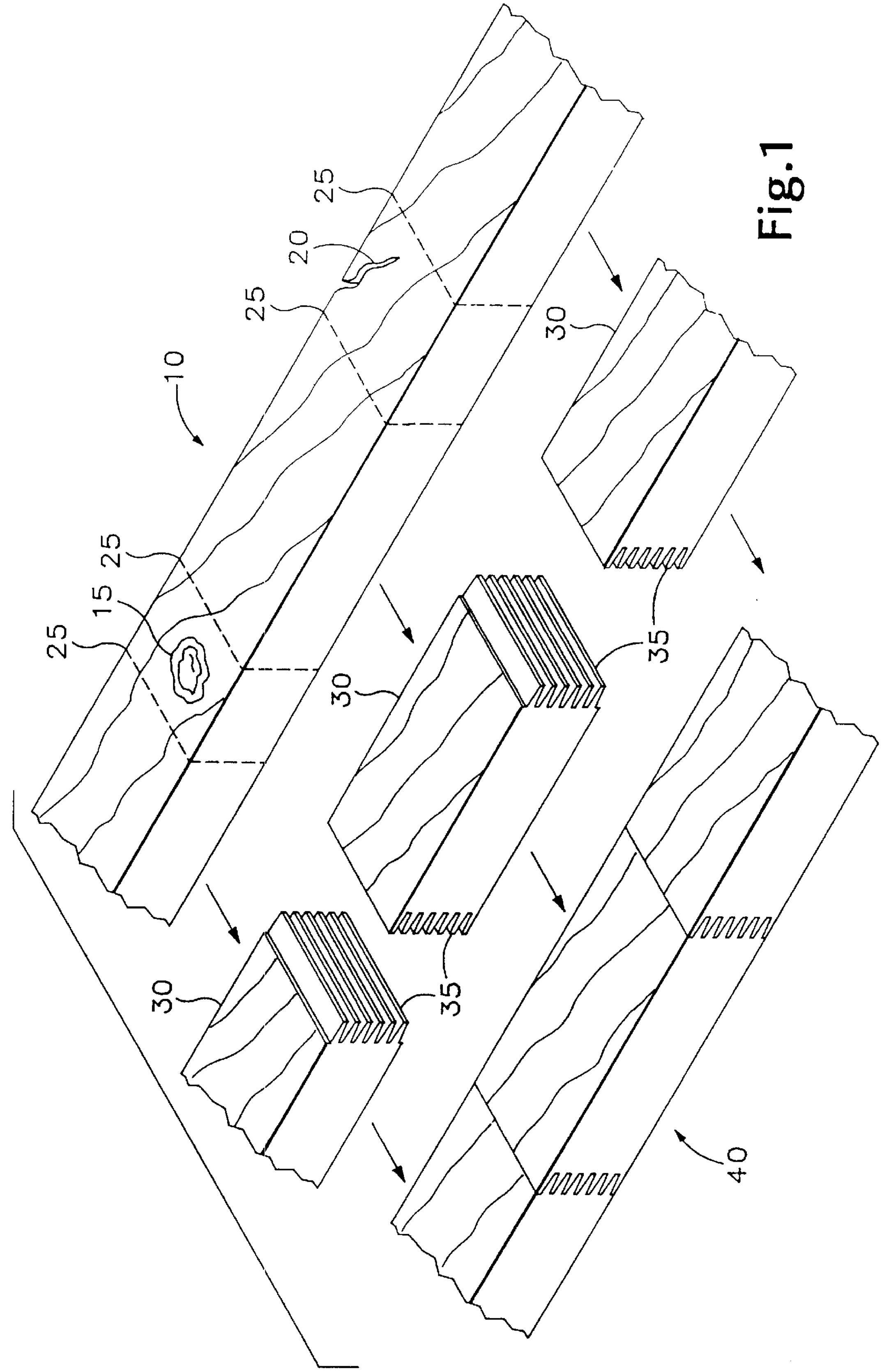
FIG. 1 shows the process of forming a long clear board from a piece of low grade lumber by joining several short blocks together with finger joints.

The steps in producing clear lumber according to the present invention are illustrated in FIG. 1. A long, low grade piece of lumber 10, including a number of defects, such as knots 15 and crack 20, is cut along lines 25 to create a number of short clear blocks 30. A pattern of wedges or fingers 35, known as a finger joint, is milled into the ends of each block 30 and glue is applied to the milled ends. Blocks 30 are then pressed together to form a single long board 40, free of any defects. In practice, blocks 30 may be cut from low grade lumber or they may be recovered remnants or scraps from some other process.

Figures 2A, 2B:
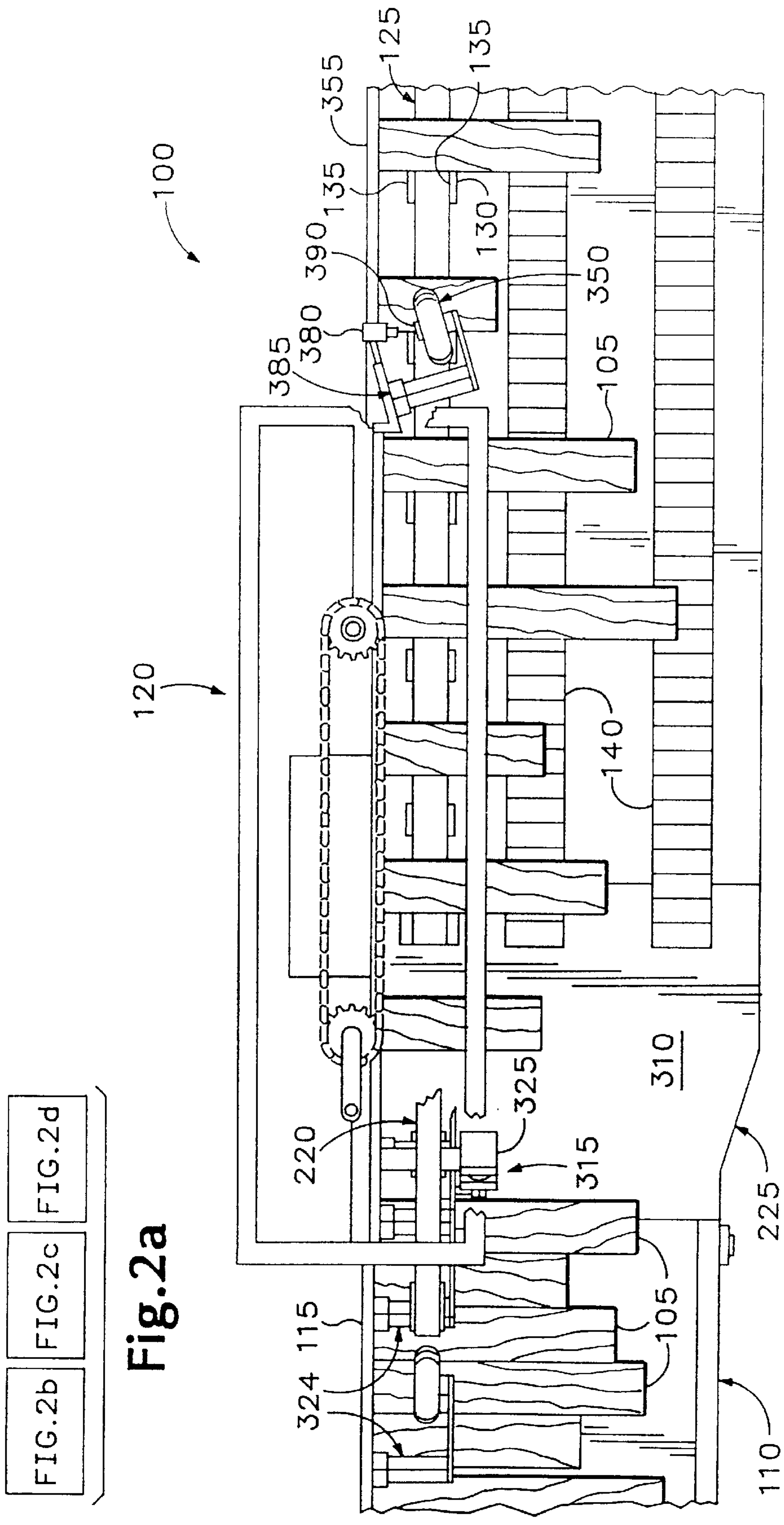
FIG. 2*a* shows the proper arrangement of FIGS. 2*b*–2*d*.
FIGS. 2*b*–2*d* show a top plan view of a finger jointing machine constructed according to the present invention.
Figure 2C:
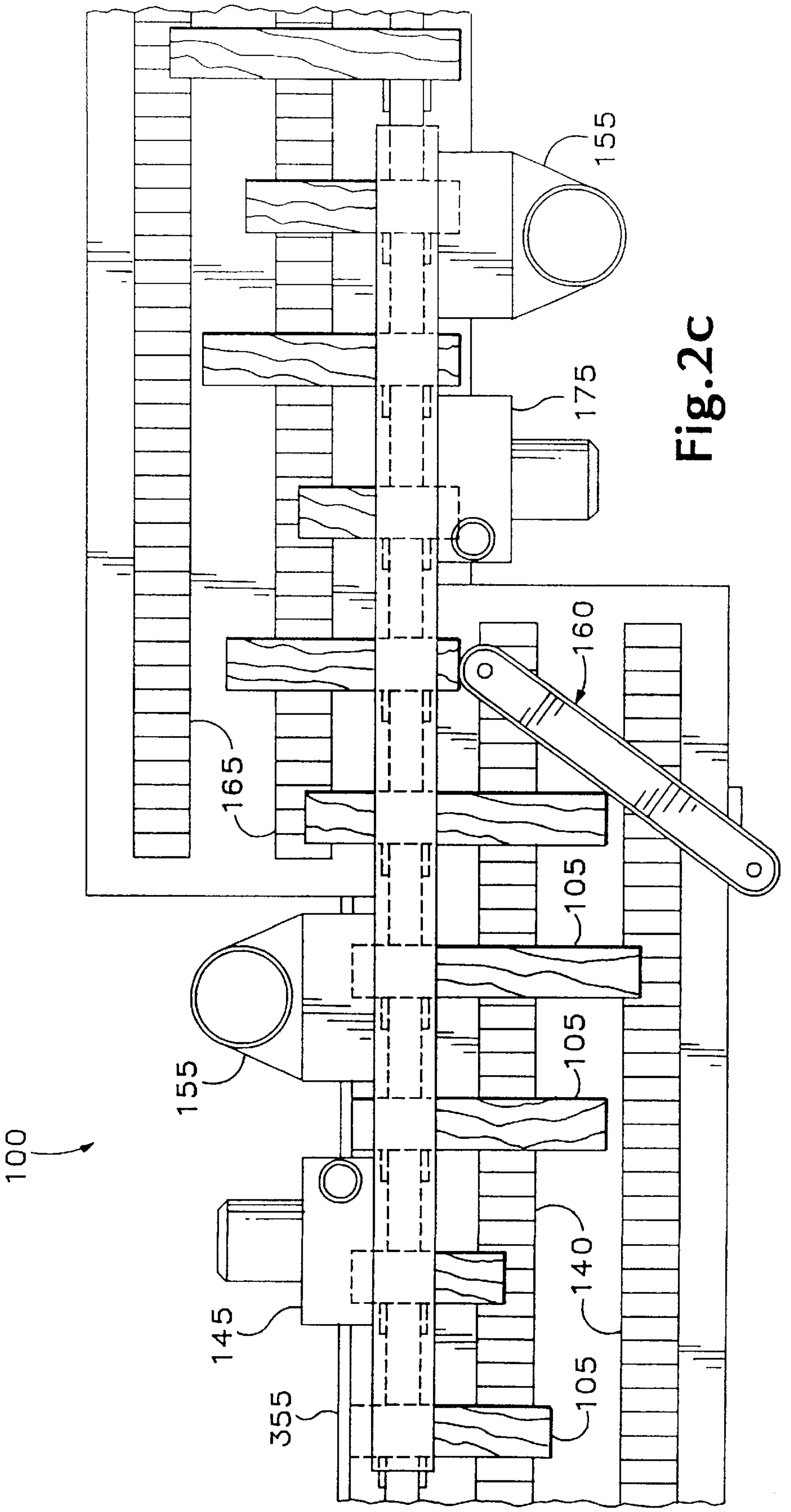
Figure 2D:
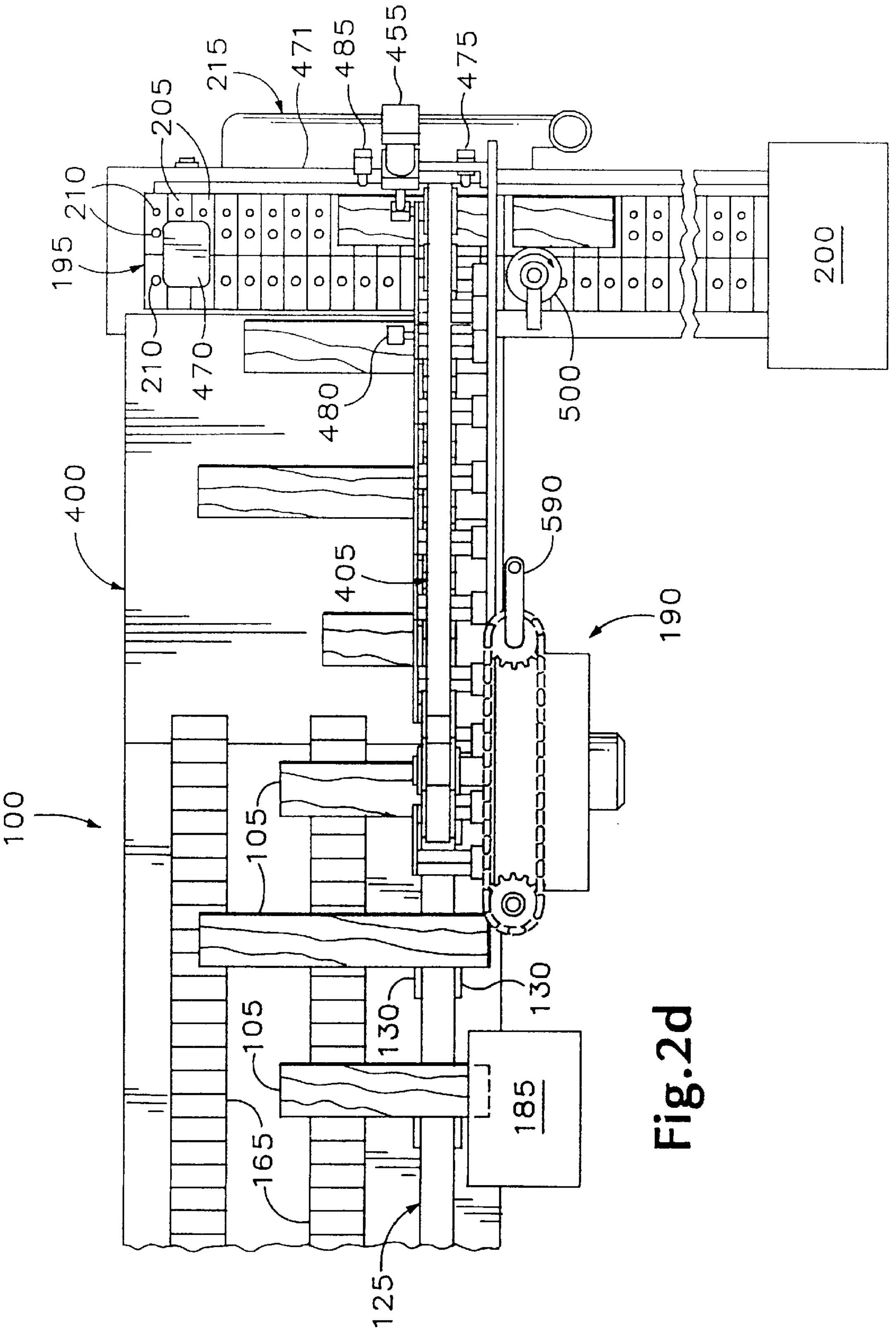

A simplified top view of an automated finger jointing machine constructed according to the present invention is shown generally at 100 in FIGS. 2*b*–2*d*. Finger jointing machine 100 automatically carries out the milling, gluing and pressing steps described above.

A sequence of blocks 105 to be joined are brought to finger jointing machine 100 on an intermittently operable supply conveyor 110 on which they are lined up side-by-side with one end abutting a fence 115. The arrangement of blocks 105 from a supply source onto supply conveyor 110 may be automated but is often done manually.

Blocks generally flow from left to right in FIGS. 2*b*–2*d* with the left end therefore being the upstream end. After being carried to the downstream end of supply conveyor 110, blocks 105 are picked up by an automatic lug loader 120. Loader 120, which is described in more detail below, transports blocks 105 at controlled intervals from supply conveyor 110 to a lug conveyor 125.

Lug conveyor 125 is an endless belt type conveyor that travels in a loop. It includes a number of evenly spaced lugs 130. Each lug includes a pair of spaced-apart, upwardly projecting blades 135. The leading edges of blades 135 in each pair are aligned along a line perpendicular to the direction of travel of lug conveyor 125 to provide an alignment reference for blocks 105. As blocks 105 are pressed against blades 135, they are pivoted into alignment perpendicular to the direction of travel. Blocks 105 are supported from below at one end by the surface of lug conveyor 125. A first pair of support conveyors 140 are laterally spaced from, and extend parallel to, lug conveyor 125 to support the ends of blocks 105 opposite lug conveyor 125. Blocks 105 may be barely longer than the width of lug conveyor 125, or they may be long enough to extend over one or both support conveyors 140. Support conveyors move at the same speed as lug conveyor 125 and are typically driven off the same motor.

Lug conveyor 125 carries blocks 105 past a squaring saw 145 and a scoring saw 150 (shown in FIG. 3*c*) which prepare one end for milling. Squaring saw 145 cuts the end of each block to insure that it is flat and square. Scoring saw 150 cuts a shallow groove across the surface of each block to reduce chipping in the subsequent milling step. Blocks 105 are then carried to a first shaper 155, which is where a finger joint is milled into the prepared end. As lug conveyor 125 continues to move blocks 105 through finger jointing machine 100, the unmilled ends of blocks 105 are engaged by a shifting conveyor 160 which slides blocks 105 transversely across lug conveyor 125 until the unmilled ends are aligned next to blades 135. Shifting conveyor 160 has a vertically oriented face and is angled relative to and extends across lug and support conveyors 125 and 140.

A second pair of support conveyors 165 support the ends of blocks 105 opposite lug conveyor 125 after they are slid across and the unmilled ends are aligned next to lugs 130. Lug conveyor 125 then carries blocks 105 past a second squaring saw 170 (shown in FIG. 3*c*), a second scoring saw 175 and a second shaper 180 (shown in FIG. 3*c*) where the newly aligned ends are prepared and milled with a finger joint.

After both ends are milled, lug conveyor 125 carries blocks 105 past a glue station 185 where glue is applied to the freshly milled ends. Since the blocks are to be joined end-to-end, it is only necessary to apply glue to one end to have glue in every joint. It is also possible, however, to apply glue to both ends if desired. As blocks 105 reach the downstream end of lug conveyor 125, they are received by a comer apparatus 190. Comer apparatus 190, which is described in more detail below, transfers blocks 105 from lug conveyor 125, where they are in a side-to-side relationship, onto transverse conveyor 195, where they are oriented end-to-end.

Transverse conveyor 195 is an endless belt type conveyor formed of a large number of small smooth metal links 205. A number of vacuum holes 210 are formed in the links and vacuum system 215 is then connected to transverse conveyor 195 to draw air through holes 210 to help hold the blocks on the conveyor. The increased grip of transverse conveyor 195 on blocks 105 provided by vacuum system 215 causes blocks 105 to accelerate rapidly to the speed of transverse conveyor 195. It is important that blocks 105 move away from the upstream end of transverse conveyor 195 without delay so that they do not interfere with the placement of subsequent blocks. For short blocks this is not a problem, but for long blocks the upstream end must be carried beyond the downstream end of the next block prior to arrival. Since the blocks may be three feet long and on twelve inch centers on lug conveyor 125, transverse conveyor 195 must move more than three times as fast as lug conveyor 125 to insure that blocks do not interfere with each other. Transverse conveyor 195, therefore, runs at a relatively high speed.

Transverse conveyor 195 carries blocks 105 downstream into a pressing station 200 where they are pressed together into a long board. The long boards thereby formed are automatically cut to length and, if necessary, trimmed to width.

Automatic lug loader 120, mentioned above, is shown in more detail in FIGS. 3*b* and 4. The loader includes a conveying element, which in the preferred embodiment is a loading conveyor 220 disposed over a support structure 225. Loading conveyor 220 is made up of an endless polyurethane belt 230 which travels around a number of support rollers 235. Support rollers 235 are secured to a loading conveyor frame 240 by resiliently biased tensioners 245. Tensioners 245 each include a base 250 which is bolted to frame 240 and a swing arm 255 pivotally attached to base 250 at one end. One of support rollers 235 is attached to the free end of each arm 255. While arm 255 may pivot relative to base 250 as arm 255 travels away from a neutral position, base 250 supplies a restoring torque to resiliently urge arm 255 back to the neutral position. The restoring force increases as the angular displacement of arm 255 is increased. Thus, rollers 235 and tensioners 245 maintain tension on belt 230 as it moves. Suitable tensioners 245 are marketed by a company called Lovejoy.

The largest share of support rollers 235 are disposed in a horizontal linear array 265 to guide belt 230 as it passes over support structure 225 and the upstream end of lug conveyor 125. The track of belt 230 over lug conveyor 125 is centered on lugs 130 between blades 135. Other rollers include a trailing roller 280 supporting the belt above the downstream end of linear array 265 and a roller 270 supporting the belt at the infeed end of loading conveyor 220. The pivotal motion of swing arms 255 allows rollers 235 in linear array 265 to rise and fall slightly as belt 230 drags blocks 105 under rollers 235. Additionally, the restoring torque on arms 255 helps to maintain the tension in belt 230 and the pressure of belt 230 on the upper surfaces of blocks 105. The tension provided by tensioners 245 keeps belt 230 from sagging under linear array 265.

Belt 230 is powered by a drive wheel 290, which is in turn driven by a chain 295 running on a sprocket 300 connected to end roll 305 of lug conveyor 125. This insures a constant speed and position relationship between belt 230 and lug conveyor 125, which is important to the proper loading of lugs 130 as discussed below. Two tension rollers 285 are located on either side of drive wheel 290. Tension rollers 285 are biased to hold belt 230 against drive wheel 290 to insure adequate traction between wheel 290 and belt 230.

Support structure 225 includes a support table 310 which extends from the downstream end of supply conveyor 110 to the upstream end of lug conveyor 125 to form a substantially continuous bridge therebetween. Support table 310 is preferably formed of a flat sheet of metal and should be relatively slick to allow blocks 105 to slide easily over its surface.

Disposed beneath loading conveyor 220 at the upstream end of support structure 225 is a control station 315. Control station 315, shown in detail in FIG. 4, includes a plurality of intermeshing rollers 320 with their upper surfaces substantially aligned with the surface of support table 310. Intermeshing rollers 320 significantly reduce the friction between support structure 225 and blocks 105 at control station 315. Supply conveyor 110 delivers blocks 105 to loader 120 with one end positioned over control station 315 and under loading conveyor 220.

As blocks 105 are transported to the downstream end of supply conveyor 110, two overlying crowding rollers 322 act to remove any gaps and stabilize the blocks as they reach the downstream end. Crowding rollers 322 are each mounted on a tensioner 324 and have a frictional hub inhibiting rotation. Blocks 105 are held back by rollers 322 until several are pushed together, thereby providing sufficient force to rotate the rollers. The roller at the downstream end of supply conveyor 110 also helps to prevent blocks from tipping over the end of the conveyor and catching on the upstream end of support table 310.

Figure 4:
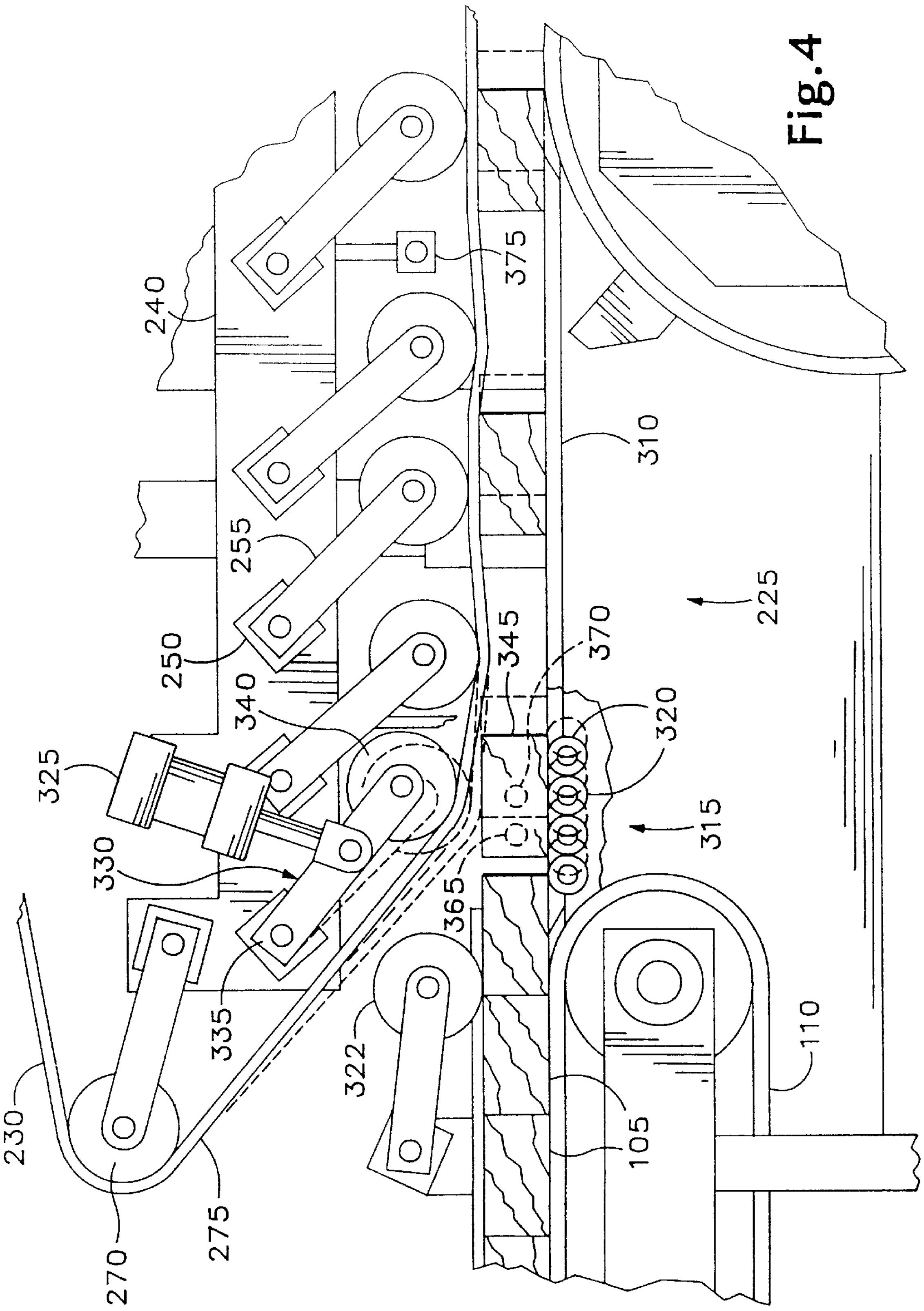
FIG. 4 is a detail view of the upstream end of the lug loader shown in FIG. 3*b*.

A powered adjuster in the form of a pneumatic cylinder 325 is connected to a leading tensioner 330 in linear array 265 to form a feeder for sequentially and successively feeding blocks into the machine. Hydraulic, electric or other cylinders may be used instead of a pneumatic cylinder. Cylinder 325 is connected to a swing arm 335 on leading tensioner 330 to raise and lower the associated guide roller 340, which in turn raises and lowers belt 230 over control station 315 as shown in FIG. 4. Belt 230 tracks with roller 340 because of the tension supplied and maintained by tensioners 245, which take up any slack created when the belt is raised and lowered over control station 315.

As long as cylinder 325 is retracted and belt 230 is raised, a block 345 sitting between control station 315 and belt 230 will remain there, since nothing will propel it forward. However, when cylinder 325 is extended, the path of belt 230 is changed, causing it to contact the upper surface of block 345. Caught between belt 230 and rollers 320, block 345 begins to travel with belt 230, as indicated by the dashed lines in FIG. 4. Block 345 passes off of rollers 320 and continues with belt 230, sliding over the surface of support table 310 until it reaches lug conveyor 125.

The portion of belt 230 between roller 270 and roller 340 forms an inclined region 275. Inclined region 275 reduces the force required to raise and lower belt 230 over control station 315.

Figures 3A, 3B, 3C, 3D:
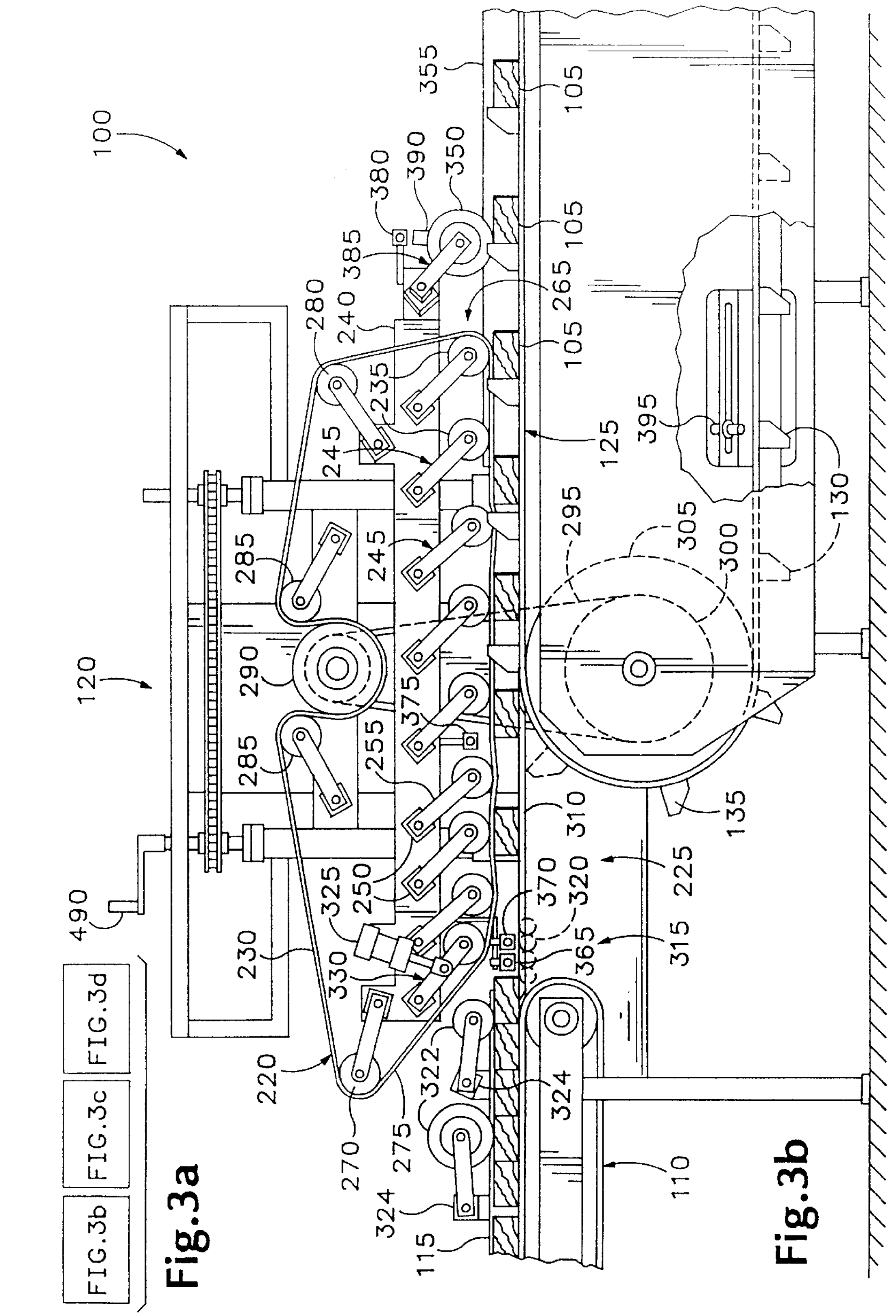
FIG. 3*a* shows the proper arrangement of FIGS. 3*b*–3*d*.
FIGS. 3*b*–3*d* show side views of the portions of the finger jointing machine shown in FIGS. 2*b*–2*d*, respectively.
Figure 3C:
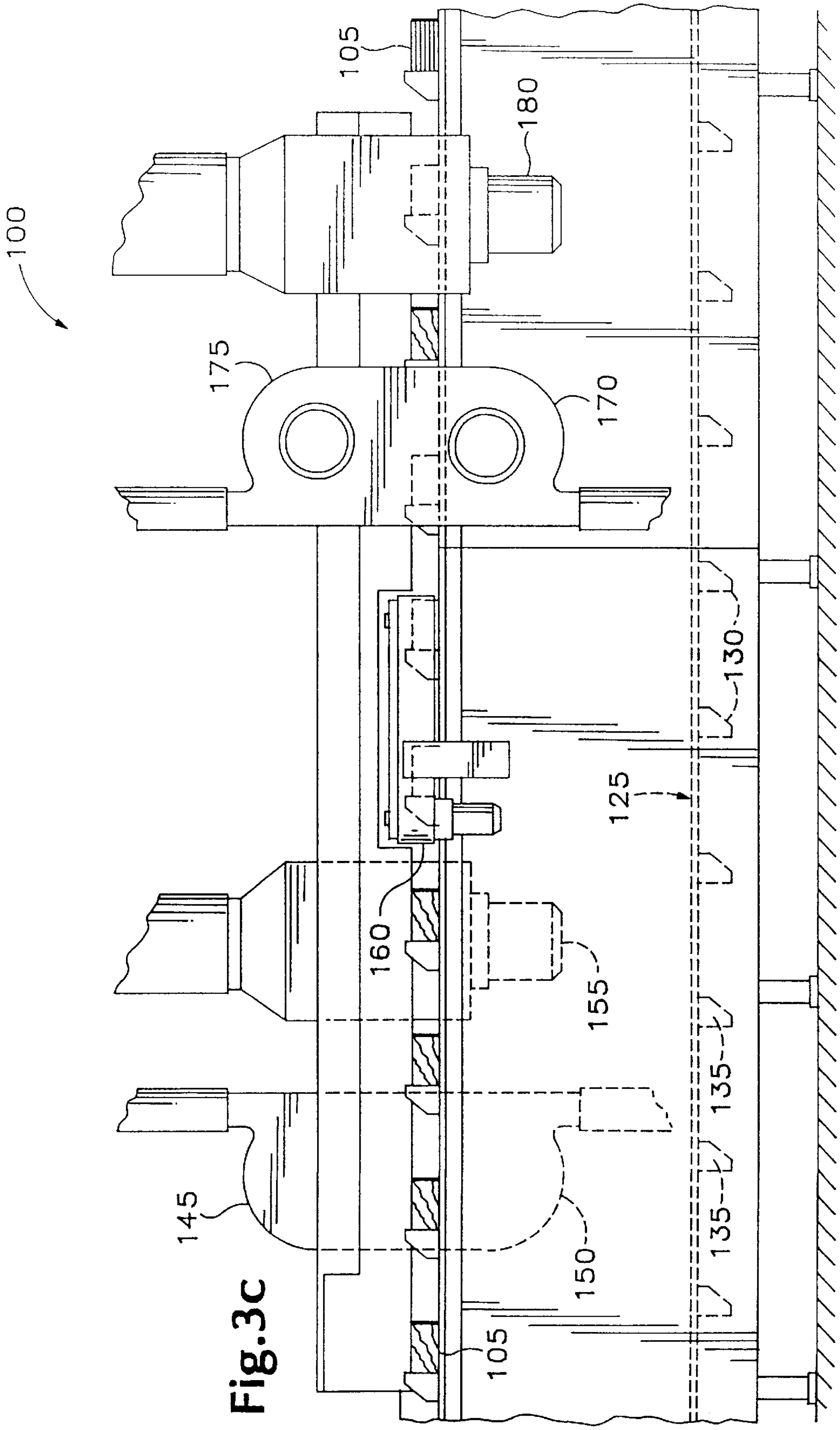
Figure 3D:
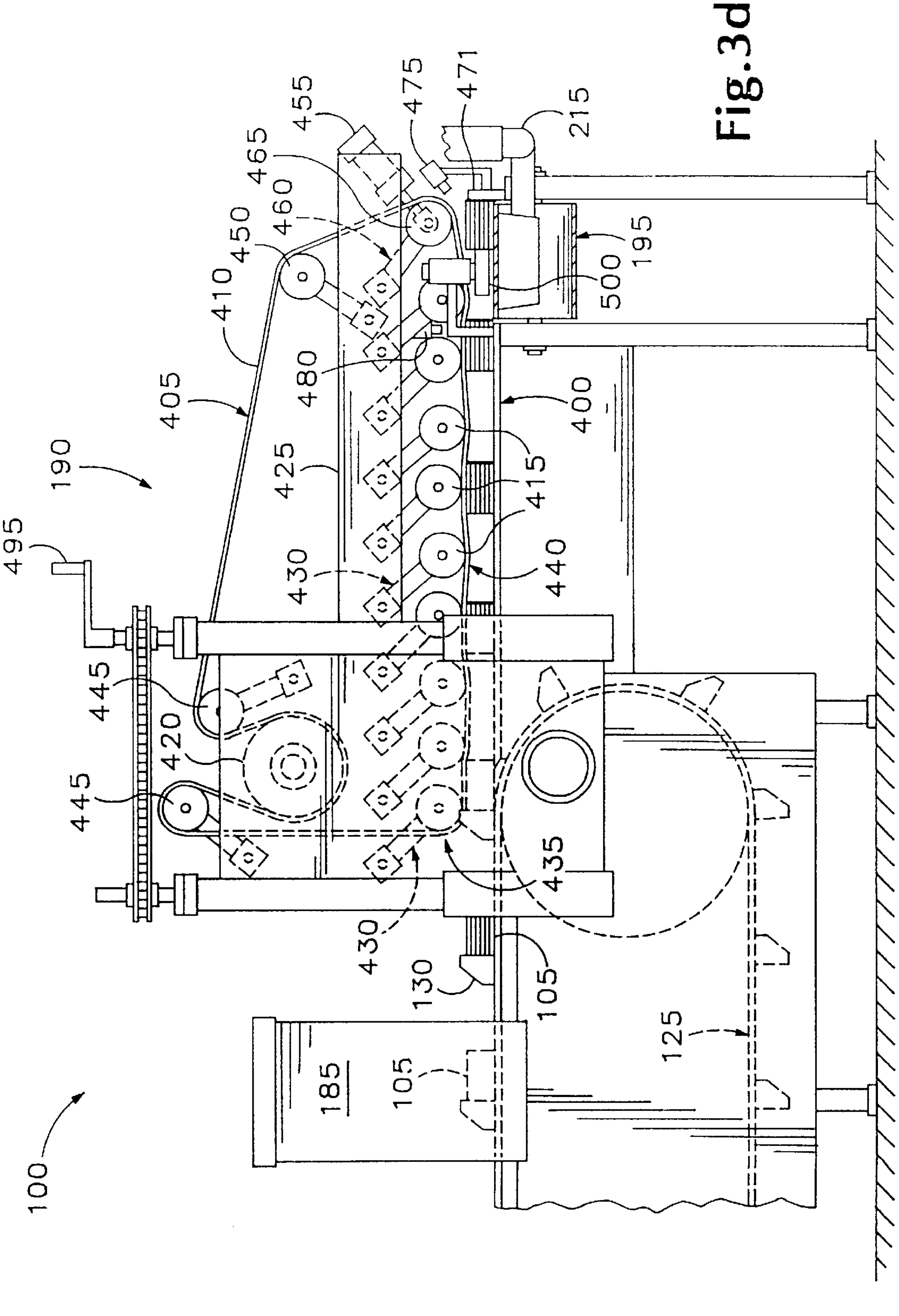

Cylinder 325 is actuated in synchronization with lug conveyor 125 to insure that blocks 105 are delivered to lug conveyor 125 with one being delivered in front of each of lugs 130. Belt 230 may move at a slower speed than lug conveyor 125, thereby allowing lugs 130 to catch blocks 105 moving with belt 230, as shown in FIG. 3*b*. This speed differential reduces the precision required in the timing of actuation of cylinder 325. Cylinder 325 can be actuated to deliver blocks 105 roughly half way between each pair of lugs 130. Lugs 130 will then catch blocks 105 as belt 230 and lug conveyor 125 progress. As an added benefit, when lugs 130 catch blocks 105, blocks 105 are urged back against lugs 130 by the action of the slower moving belt 230. This corrects any angular misalignment and makes blocks 105 properly perpendicular to lug conveyor 125.

When finger jointing wider blocks, belt 230 may be driven somewhat faster than lug conveyor 125. This has the disadvantage that the blocks are no longer urged back against the lugs, but rather pushed forward against the back of the preceding lug. Pushing the block against the back of the preceding lug allows the absolute maximum width of block to be placed between the lugs.

A positioning wheel 350 just downstream from the downstream end of loading conveyor 220, as shown in FIG. 3*b*, further promotes alignment of blocks 105. The track of wheel 350 is angled slightly toward a fence 355 against which the ends of blocks 105 are abutted prior to milling. As blocks 105 pass under wheel 350, they are urged toward fence 355. Wheel 350 has a moderate amount of drag inhibiting free rotation so that blocks 105 are further driven back against lugs 130 as they pass underneath wheel 350.

The timing and operation of cylinder 325, supply conveyor 110 and lug conveyor 125 are regulated by a control system that processes inputs from several sensors. The sensors are reflected light photo-detectors in the preferred embodiment, but could also be beam interruption photo-detectors or even mechanical switches. The signal from a supply sensor 365 disposed beside control station 315 is used to trigger the intermittent operation of supply conveyor 110. Supply conveyor 110 is triggered to operate any time supply sensor 365 does not detect a block over control station 315. Therefore, as soon as loading conveyor 220 moves one block downstream away from control station 315, supply sensor 365 sends a signal which triggers supply conveyor 110 to start moving to deliver another block.

After belt 230 is lowered and the block currently over control station 315 starts to move, a clear sensor 370, positioned adjacent to supply sensor 365, signals when the block has cleared control station 315. This notifies the control system that it is time to raise belt 230 to prepare for the next block. If belt 230 is not raised as soon as possible, the block being delivered by supply conveyor 110 to control station 315 will be engaged immediately by belt 230, which would result in the second block following too closely behind the first block. Since only a small portion of belt 230 near the upstream end is raised and lowered, blocks that have started to move with the belt will continue to be drawn with it, even when the portion of the belt over the control station is raised. Both supply sensor 365 and clear sensor 370 are mounted so that they can slide back and forth to compensate for differing width boards and achieve proper operation. In order to avoid obscuring sensors 365 and 370, the upstream block under belt 230 has been omitted in FIGS. 2*b* and 3*b*. It should be understood that an additional block would normally follow the downstream blocks at equally spaced intervals under belt 230. As an alternative to using two sensors, a signal from one sensor can be used in conjunction with a delay timer to monitor the position of boards and determine when to raise the belt and move the next block into position.

A first misfeed sensor 375 is disposed above the upstream end of lug conveyor 125. Misfeed sensor 375 is triggered if a block arrives at the upstream end of lug conveyor 125 just as one of lugs 130 rises around end roll 305. If this happens, the block will be lifted by the lug and detected by the sensor. A second misfeed sensor 380 is disposed over positioning wheel 350 to detect overly thick blocks. Positioning wheel 350, which is mounted on a resilient tensioner 385, normally raises and lowers slightly as blocks 105 pass underneath. If however, an overly thick block passes under positioning wheel 350 it will be raised sufficiently that an attached tab 390 will trigger second misfeed sensor 380. If either misfeed sensor 375 or 380 signals the control system of an irregularity, loader 120, supply conveyor 110 and lug conveyor 125 will stop.

As discussed above, the actuation of cylinder 325 is timed to start blocks 105 moving so that one arrives at lug conveyor 125 between each pair of lugs 130. In order to achieve this result, it is necessary to track the positions of lugs 130. This is accomplished by a lug tracking sensor 395 disposed to detect lugs 130 on the returning portion of lug conveyor 125, as shown in FIG. 3*b*. Given the speed of lug conveyor 125, the lug spacing and the position of a lug as signaled by tracking sensor 395, it is possible to determine how long it will be until subsequent lugs 130 arrive at the upstream end of lug conveyor 125. The control system, taking into account the speed of belt 230, actuates cylinder 325 so that a block will arrive between each pair of lugs 130.

In the event of a supply interruption on the supply conveyor it may happen that no block is available at the control station 315 for loading conveyor 220 to deliver to the next available lug. When the supply is restored, the control system will determine if there is sufficient time for the block to be delivered in front of the next arriving lug. If there is not sufficient time, given the speed of the loading conveyor and the current location of the lug, the control system will delay actuating cylinder 325. The control system will time the actuation of cylinder 325 so that the block will arrive in front of the lug after the next lug.

After blocks 105 are loaded on lug conveyor 125, milled on both ends and glue has been applied to one end, they are ready to be pressed together, end-to-end, to form a long clear board. As discussed generally above and as shown in FIG. 3*d*, comer apparatus 190 receives blocks 105 from the downstream end of lug conveyor 125 and transfers them to transverse conveyor 195.

Comer apparatus 190 includes an elongate support structure 400 with an upstream end adjacent the downstream end of lug conveyor 125. Support structure 400 further includes a downstream end disposed adjacent the side of the upstream end of transverse conveyor 195, thereby forming a substantially continuous bridge between the downstream end of lug conveyor 125 and the upstream end of transverse conveyor 195. In the preferred embodiment, support structure 400 is formed of a sheet of flat smooth metal.

A transfer conveyor 405, similar in construction and operation to loading conveyor 220, overlies the downstream end of lug conveyor 125 and extends across support structure 400 to the upstream end of transverse conveyor 195. Transfer conveyor 405 is formed by an endless rubber belt 410 riding on a number of support rollers 415 and driven by a drive wheel 420. Two tension rollers 445 disposed on either side of wheel 420 insure that belt 410 has sufficient contact with wheel 420. Support rollers 415 are mounted to a transfer conveyor frame 425 by the same type of tensioner 430 as used in loading conveyor 220. A horizontal linear array 435 of rollers 415 is disposed to support belt 410 as it extends between lug conveyor 125 and transverse conveyor 195 to create a lower gripping surface 440. Another roller 450 supports belt 410 above the downstream end of linear array 435.

A pneumatic cylinder 455 is connected to a tensioner 460 supporting a roller 465 at the downstream end of linear array 435. Cylinder 455 reciprocally drives roller 465 and belt 410 up and down over transverse conveyor 195 upon actuation. Hydraulic, electric or other cylinders may also be used.

In operation, lower gripping surface 440 of belt 410 engages the upper surface of blocks 105 as they arrive at the downstream end of lug conveyor 125. Blocks 105 are then drawn across support structure 400 to transverse conveyor 195. A small amount of light oil may be dripped on transverse conveyor 195 from oil reservoir 470 to prevent accumulation of glue dripping from the glued ends of blocks 105.

Figure 5:
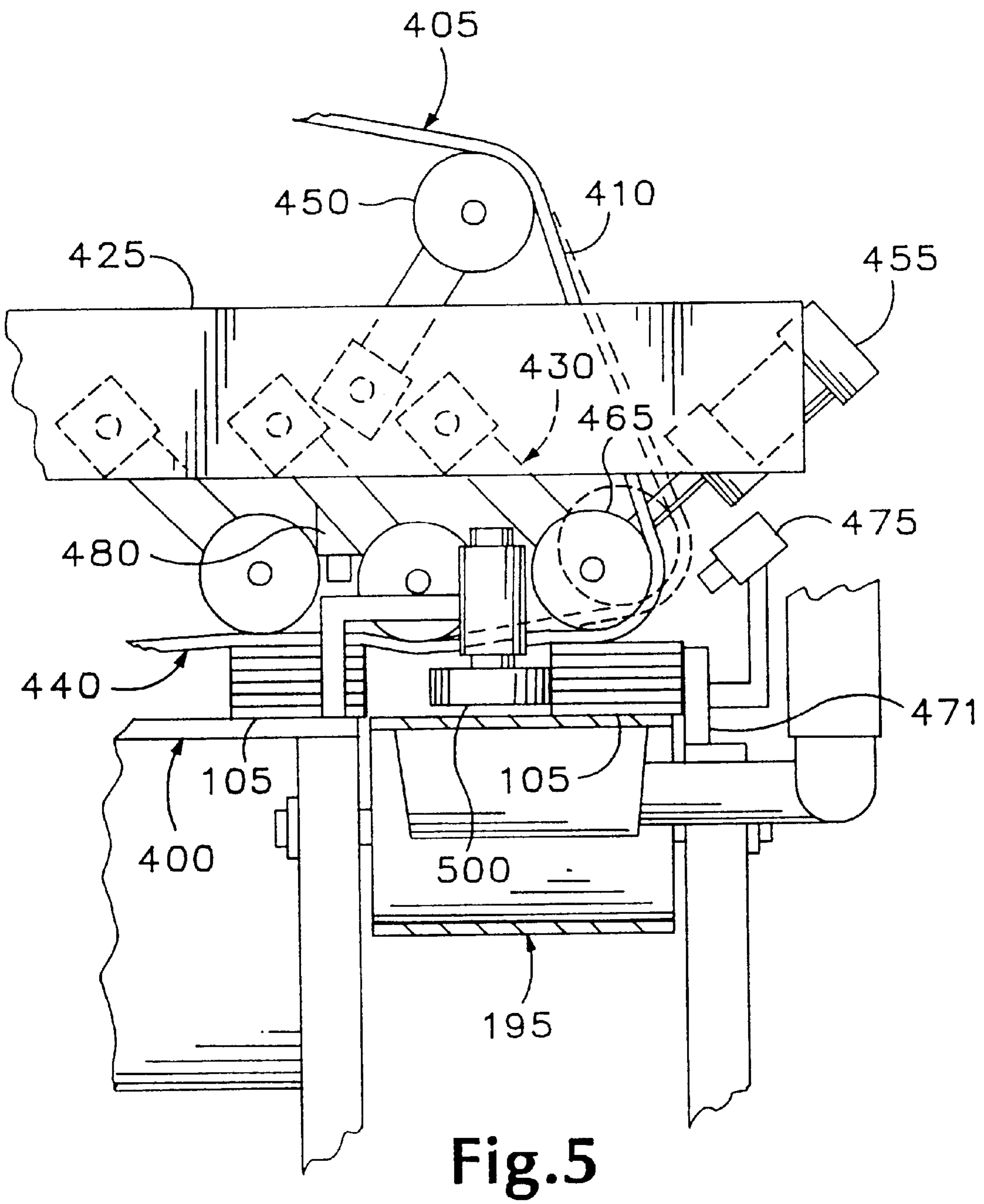
FIG. 5 is detail view of the downstream end of the comer apparatus of the present invention shown in FIG. 3*d*.

After crossing support structure 400, belt 410 carries blocks 105 onto transverse conveyor 195. Transverse conveyor 195, which runs continuously, slides by underneath blocks 105 as long as belt 410 is held firmly against the upper surface of the blocks. As soon as belt 410 has transported blocks 105 to a fence 471 at the far side of transverse conveyor 195, cylinder 455 is actuated to alter the track of belt 410 by raising it over blocks 105, as shown by the dashed lines in FIG. 5. When belt 410 is raised blocks 105 are released to begin traveling with transverse conveyor 195.

A drive wheel 500 is positioned just downstream on transverse conveyor 195 from belt 410. Drive wheel 500 is spring biased toward fence 471, thereby urging blocks 105 firmly against the fence. In addition, drive wheel 500 supplies force to accelerate blocks 105 up to the speed of transverse conveyor 195.

The control system monitors a positioning sensor 475, shown in FIG. 2*d*, disposed over transverse conveyor 195 just downstream from the downstream end of belt 410 to control the actuation of cylinder 455. Positioning sensor 475 detects blocks 105 as they arrive against fence 471. When the control system receives a signal from positioning sensor 475 indicating that a block is in position against the fence, it actuates cylinder 455 to raise belt 410, thereby releasing the block. The control system keeps belt 410 raised until positioning sensor 475 no longer detects a block, indicating that the block has cleared belt 410.

A first misfeed sensor 480, also shown in FIG. 2*d*, is positioned slightly upstream on transverse conveyor 195 from positioning sensor 475. In normal operation, blocks 105 intermittently pass in front of misfeed sensor 480 and remain for a short time before moving down transverse conveyor 195. Only if there is some type of interruption in the flow of blocks 105 will misfeed sensor 480 detect a block for more than a short interval of time. Therefore, if misfeed sensor 480 detects a block for more than a few moments, the control system shuts down lug conveyor 125.

A second misfeed sensor 485, shown in FIG. 2*d*, is disposed over support structure 400 and operates in a fashion similar to first misfeed sensor 480. Under normal circumstances, blocks 105 pass by misfeed sensor 485 at regular intervals. In the event of some disruption in flow, however, second misfeed sensor 485 may detect a single block for an extended period of time. As before, if this happens, the control system will shut down lug conveyor 125.

A crank 490 located above loader 120 and a crank 495 located above comer apparatus 190 is used to raise and lower loader and comer apparatus, respectively, to accommodate various thickness blocks, as shown in FIGS. 3*b* and 3*d*.

Figure 6:
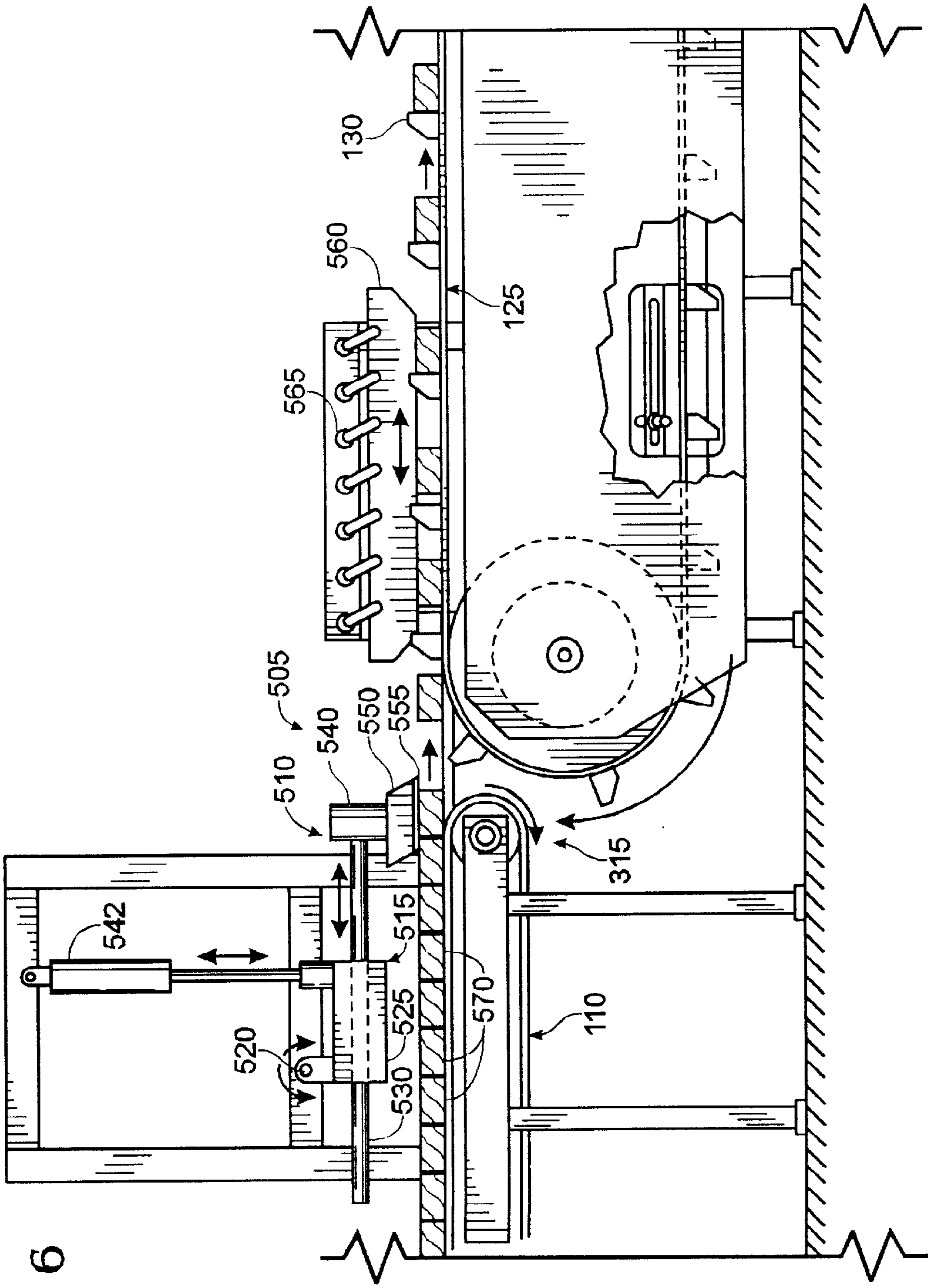
FIG. 6 is a side elevation view of an alternative embodiment of a lug loader constructed according to the present invention.

An alternative automatic lug loader according to the present invention is shown generally at 505 in FIG. 6. As with lug loader 120, lug loader 505 is fed by supply conveyor 110 which delivers blocks to control station 315. The lug loader then loads blocks onto lugs 130 of lug conveyor 125. Lug loader 505 includes a traveling conveying element in the form of a block pusher 510. Block pusher 510 includes a thruster slide 515 pivotally mounted for pivotal motion about a pivot point 520. The thruster slide is preferably a DLT series thruster by Robohand, Inc., although other devices could of course be used as well. The thruster slide includes a thruster body 525, a piston 530 slidably mounted in the body, a pair of stabilizing bars (not shown) disposed parallel to and on either side of the piston and a carrier block 540 is mounted on the end of the piston and stabilizer bars. The piston and carrier block are prevented from rotating relative to the thruster body by the stabilizing bars, which slide in the thruster body with the piston. A powered adjuster in the form of a vertically oriented air cylinder 542 is mounted to the thruster body opposite the pivot point to selectively pivot the carrier block up and down upon activation of the air cylinder.

A block contact member 545 is disposed on the carrier block of the thruster slide. Contact member 545 includes a steel support block 550 to which a urethane pad 555 is secured. The lower surface of the urethane pad is preferably serrated or otherwise textured to better grip the top of an underlying block, as will be described in more detail below.

A retard shoe 560 is disposed over the upstream end of the lug conveyor downstream from the block pusher. The retard shoe, which is preferably approximately one-half inch thick and two inches wide and formed of ultra-high weight polyethylene, creates drag on the tops of blocks passing underneath on the lugs of the lug conveyor. The drag tends to push the blocks firmly against the lugs to thereby properly align the blocks. The shoe is preferably slightly flexible to accommodate slight variations in block thickness and is mounted on a number of tensioners 565 which are similar to tensioners 245 described above. Multiple tensioners are necessary to maintain the pressure on the underlying blocks is spite of the local flexibility of the shoe. The height of the shoe is adjustable to allow for thicker or thinner stock.

The lug loader is configured to deliver blocks at controlled intervals to the succeeding lugs of the lug conveyor. The operation of the lug loader is controlled by sensors as described above in connection with lug loader 120. More particularly, the supply conveyor delivers blocks 570 to the control station where they are positioned under the contact member. At the beginning of a cycle, a block is disposed under the contact member and cylinder 542 is extended to press the contact member against the top of the block. At a time synchronized to coincide with the arrival of one of the lugs on the lug conveyor, the thruster slide is actuated to push the block out in front of one of the approaching lug. The lug catches the block and carries it forward under the retard shoe which drags the block back against the lug. After delivering the block, the contact member is lifted by cylinder 542 and the thruster slide is retracted to the starting position. In the meantime, the supply conveyor has been activated to deliver another block into the control station. Cylinder 542 is then actuated to push the contact member down against the next block and the cycle starts anew.

Figure 7:
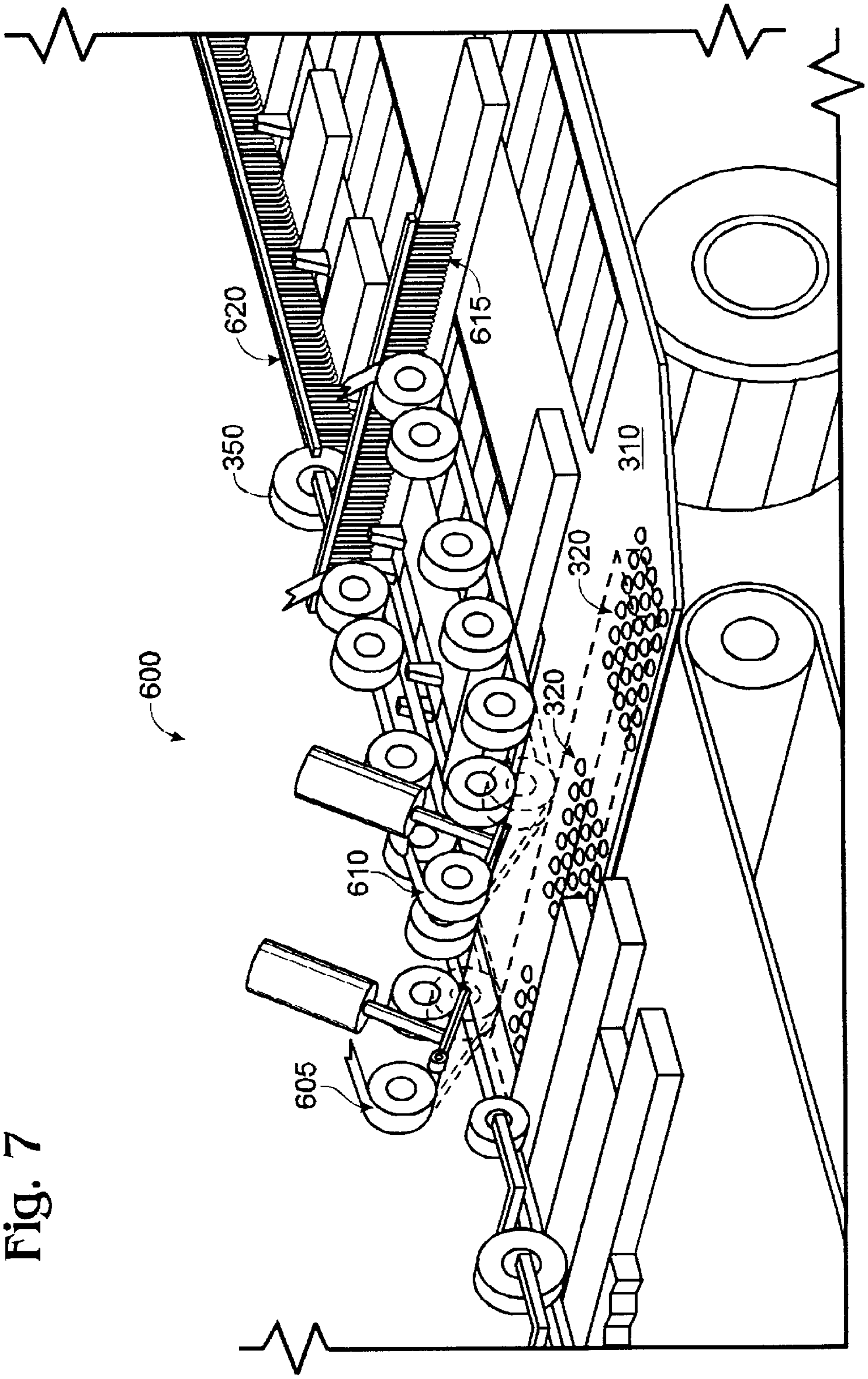
FIG. 7 is a perspective view of another alternative embodiment of a lug loader constructed according to the present invention.

A second alternative automatic lug loader according to the present invention is shown generally at 600 in FIG. 7. Lug loader 600 is constructed very similarly to lug loader 120, with the major difference being that lug loader 600 includes a pair of spaced-apart parallel loading conveyors 605, 610. Each of loading conveyors 605, 610 is constructed and operated similarly to loading conveyor 220. Loading conveyor 605 is positioned in alignment with lug conveyor 125, similar to the positioning of loading conveyor 220. Loading conveyor 610 is located in alignment over innermost support conveyer 140. By providing a pair of spaced-apart loading conveyors, longer boards are better stabilized against lengthwise rotation during transport by the loading conveyors. Specifically, by maintaining contact with the boards at spaced-apart locations on the board, the two belts provides much-improved rotational stability as the board are initially gripped by the belts or transported over the table relative to a single belt. As with loading conveyor 220, the belts on loading conveyors 605, 610 may be driven slower or faster than the lug conveyor depending on the width of the blocks to be loaded.

As can be seen by comparing FIGS. 3*b* and 7, loading conveyors 605, 610 have fewer rollers and are shorter in length than loading conveyor 220. Support table 310 is correspondingly shortened and includes two sets of intermeshing rollers 320. A transverse brush 615 is positioned just past the downstream end of loading conveyors 605,610 and serves to stall the motion of blocks to allow the following lug to catch up. The brush also tends to correct any misalignment of the blocks. In particular, after the block is released by the loading conveyors it is resting on, and therefore moving with, the lug and support conveyors. The brush provides enough resistance to cause the block to stop with the lug and support conveyors sliding by underneath. If a long block is tilted, then one end will hit the brush and stop while the other end continues to move forward until it too hits the brush, thereby realigning the block. When the lug reaches the block, it pushes it past the brush and positioning wheel 350 forces the block firmly against the lug. A longitudinally oriented brush 620 is positioned over the lug conveyor to further urge blocks back against the lugs.

Figure 8:
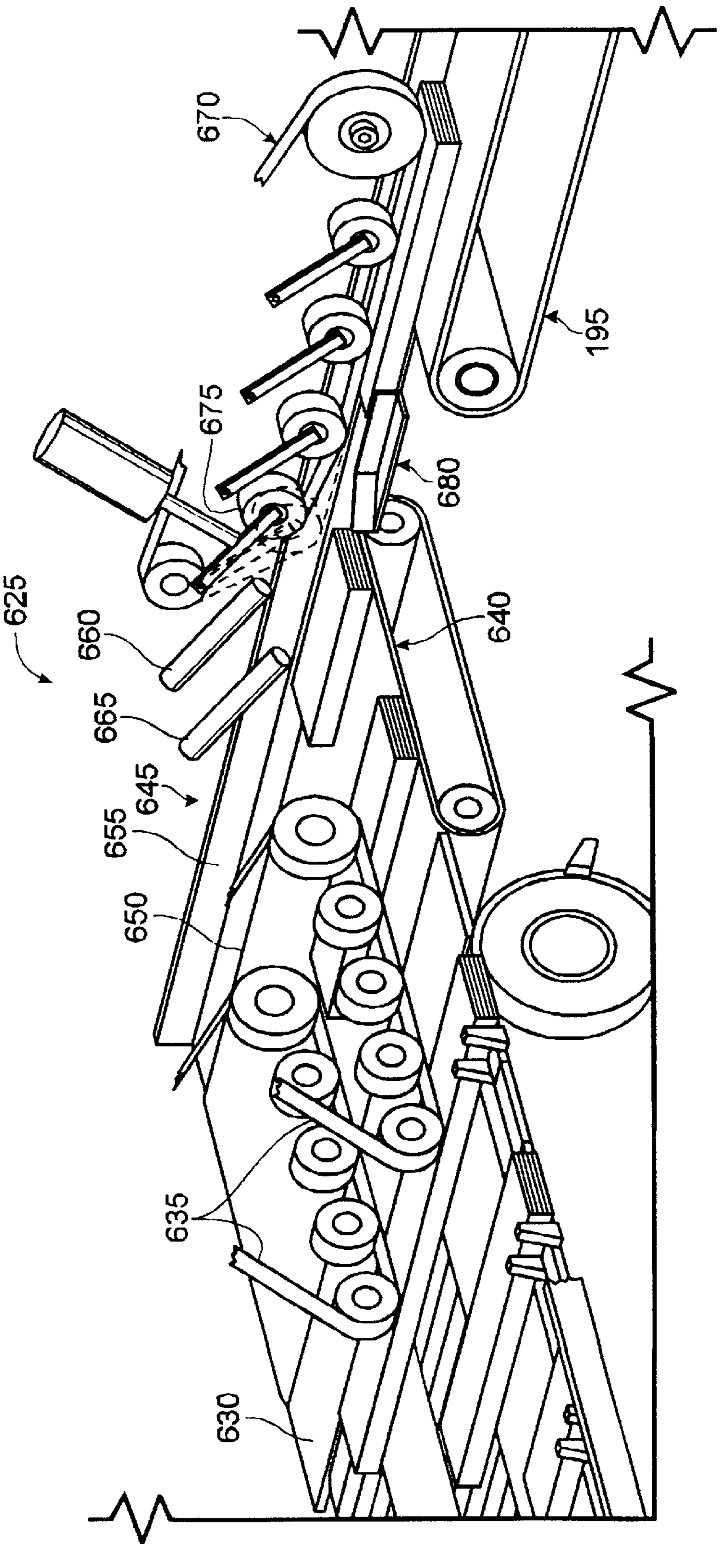
FIG. 8 is a perspective view of an alternative embodiment of a comer apparatus constructed according to the present invention.

An alternative comer apparatus is shown in FIG. 8 generally at 625. Comer apparatus 625 includes a short support surface 630 positioned to receive blocks coming off the end of the lug conveyor. A parallel set of overhead transfer conveyors 635 engages the upper surface of the blocks as they come onto the support surface to slide the blocks across the support surface to a lower transfer conveyor 640. The overhead transfer conveyor is constructed similarly to loading conveyors 220 and 605, 610, but is not articulated since it operates continuously to engage blocks as soon as they arrive. As with loading conveyors 605, 610, the use of two overhead conveyors provides improved rotational stability as the boards are transported.

Lower transfer conveyor 640 receives the blocks from the upper transfer conveyor and support surface and carries them to a control or staging zone 645 adjacent the upstream end of transverse conveyor 195 feeding the pressing station 200 (not shown in FIG. 8). Staging zone 645 includes an elongate receiving platform 650 disposed across the downstream end of the lower transfer conveyor to receive boards off the end thereof. An elongate stop 655 projects up from the platform opposite the transfer conveyor.

As boards leave the end of the transfer conveyor they are pushed up against stop 655, thereby insuring proper alignment for subsequent feeding into pressing station 200. In particular, the stop and receiving platform are aligned with and adjacent to the upstream end of transverse conveyor 195 so that if a block placed adjacent the stop is moved slightly toward the pressing station it will be picked up and carried by the transverse conveyor. Sensors 660 and 665 are used to detect the presence of blocks in the staging zone and to detect backups upstream from the staging zone, respectively. Additional sensors downstream in the pressing station (not shown) are used to detect backups on the transverse conveyor so that the speed of the pressing station may be increased or the feed rate decreased.

A loading conveyor 670 is provided to selectively load blocks from the staging zone onto the transverse conveyor. Loading conveyor 670, alone or in combination with the entire corner apparatus, can be viewed as a position control apparatus or an automatic loader for a wood working machine because it loads wood into a press. The loading conveyor is constructed similarly to conveyors 220, 605 and 610 and includes a selectively moveable support roller 675 disposed over the end of the receiving platform adjacent the transverse conveyor. When a block is delivered into position on the receiving platform, support roller 675 is moved downward to bring the belt into contact with the upper surface of the block. When the belt contacts the block, the block is dragged with the belt toward and onto the transverse conveyor, which feeds the block into the pressing station. A sloped ramp 680 serves to guide the leading end of the blocks into the correct position for feeding down the transverse conveyor.

INDUSTRIAL APPLICABILITY

The invented position control method and apparatus are ideally suited for use with finger jointing machines. However, it is anticipated that they could also be beneficially applied to other types of woodworking machines. In particular, the automatic loader should be easily adaptable for use with tensioning machines, such as an automated double end tenoner.

While the invention has been disclosed in its preferred form, it is to be understood that the specific embodiment thereof as disclosed and illustrated herein is not to be considered in a limited sense and changes or modifications may be made thereto without departing from the spirit of the invention.

I claim:

1. An automatic loader to load boards into a woodworking machine at controlled intervals comprising:

a support structure including a control station and a feed table downstream of the control station;

a pair of parallel, spaced-apart powered loading conveyors overlying the support structure and each having an infeed end overlying the control station and an outfeed end; and a powered adjuster mechanism connected to the pair of loading conveyors and reciprocally operable on actuation to shift a portion of each of the pair of loading conveyors toward and away from the control station at the infeed end to selectively grip a workpiece and load it into the machine.

2. The loader of claim 1 further comprising an intermittently operable supply conveyor with a downstream end adjacent to the control station to deliver boards to the control station as required.

3. The loader of claim 2 further comprising a control system including at least one board detector to register the presence or absence of a board in the control station, where the control system triggers the supply conveyor to operate at least a portion of the time when the board detector does not register a board in the control station.

4. The loader of claim 3 where the woodworking machine includes a lug conveyor with a series of spaced apart lugs for engaging boards to be carried into the woodworking machine and the control system further includes a lug tracker to keep track of the position of lugs on the lug conveyor and the control system controls operation of the powered adjuster to shift the loading conveyor toward the control station based on the position of the lugs, thereby gripping each board to deliver it to the lug conveyor to coincide with the arrival of a lug.

5. The loader of claim 1 wherein the loading conveyors ride on a roller at the infeed end and the powered adjuster mechanism is connected to the rollers to shift them toward and away from the control station.

6. The loader of claim 5 wherein the powered adjuster mechanism includes a pressure cylinder.

7. The loader of claim 5 wherein the loading conveyor extends across the feed table and the spacing between the loading conveyor and the feed table is substantially constant and fixed.

* * * * *